(12) United States Patent
Yi et al.

(10) Patent No.: US 11,904,873 B2
(45) Date of Patent: Feb. 20, 2024

(54) COMPUTER-IMPLEMENTED SIMULATION METHOD AND SYSTEM FOR TESTING CONTROL UNITS

(71) Applicant: Robert Bosch GmbH, Stuttgart (DE)

(72) Inventors: Boliang Yi, Wiesbaden (DE); Patrick Weber, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 649 days.

(21) Appl. No.: 17/047,156

(22) PCT Filed: Jul. 10, 2019

(86) PCT No.: PCT/EP2019/068525
§ 371 (c)(1),
(2) Date: Oct. 13, 2020

(87) PCT Pub. No.: WO2020/043377
PCT Pub. Date: Mar. 5, 2020

(65) Prior Publication Data
US 2021/0122383 A1 Apr. 29, 2021

(30) Foreign Application Priority Data

Aug. 31, 2018 (DE) .......................... 102018214822.8
Sep. 10, 2018 (DE) .......................... 102018215329.9

(51) Int. Cl.
*B60W 50/02* (2012.01)
*B60W 60/00* (2020.01)
(Continued)

(52) U.S. Cl.
CPC ........ *B60W 50/0205* (2013.01); *B60W 50/14* (2013.01); *B60W 60/0015* (2020.02); *G05B 17/02* (2013.01); *G09B 9/05* (2013.01)

(58) Field of Classification Search
None
See application file for complete search history.

(56) References Cited

U.S. PATENT DOCUMENTS 9,691,298 B1 6/2017 Hsu-Hoffman et al.
10,026,130 B1 7/2018 Konrardy et al.
(Continued)

FOREIGN PATENT DOCUMENTS

DE 102016100428 A1 7/2016

OTHER PUBLICATIONS

Brown, "The Social Life of Autonomous Cars", Computer, vol. 50, 2017, pp. 92-96 (Year: 2017).*
(Continued)

*Primary Examiner* — Tamara L Weber
(74) *Attorney, Agent, or Firm* — NORTON ROSE FULBRIGHT US LLP; Gerard A. Messina

(57) ABSTRACT

A computer-implemented simulation method is described for testing a driving program for the at least partial autonomous guidance of a test vehicle. The test vehicle is moved by the driving program on a simulated road. A second vehicle in the simulation method is moved as a function of control commands of a user. The test vehicle and the second vehicle are displayed to the user including the road, data relating to the guidance of the test vehicle being collected and stored during the simulation method. A system is also described.

13 Claims, 3 Drawing Sheets

(51) Int. Cl.
*B60W 50/14* (2020.01)
*G05B 17/02* (2006.01)
*G09B 9/05* (2006.01)

(56) References Cited

U.S. PATENT DOCUMENTS

| | | | |
|---|---|---|---|
| 10,795,804 B1* | 10/2020 | Nygaard | G06F 11/3688 |
| 2013/0073138 A1 | 3/2013 | Callow | |
| 2016/0314224 A1 | 10/2016 | Wei et al. | |
| 2017/0039871 A1* | 2/2017 | Harkness | G09B 9/052 |
| 2019/0163181 A1* | 5/2019 | Liu | G05D 1/0088 |
| 2020/0041997 A1* | 2/2020 | Tuukkanen | G05D 1/0088 |

OTHER PUBLICATIONS

Tuncali et al., "Simulation-based Adversarial Test Generation for Autonomous Vehicles with Machine Learning Components", 2018 IEEE Intelligent Vehicles Symposium (IV), Changshu, Suzhou, China, Jun. 26-30, 2018, pp. 1555-1562 (Year: 2018).*
International Search Report for PCT/EP2019/068525, dated Oct. 8, 2019.

* cited by examiner

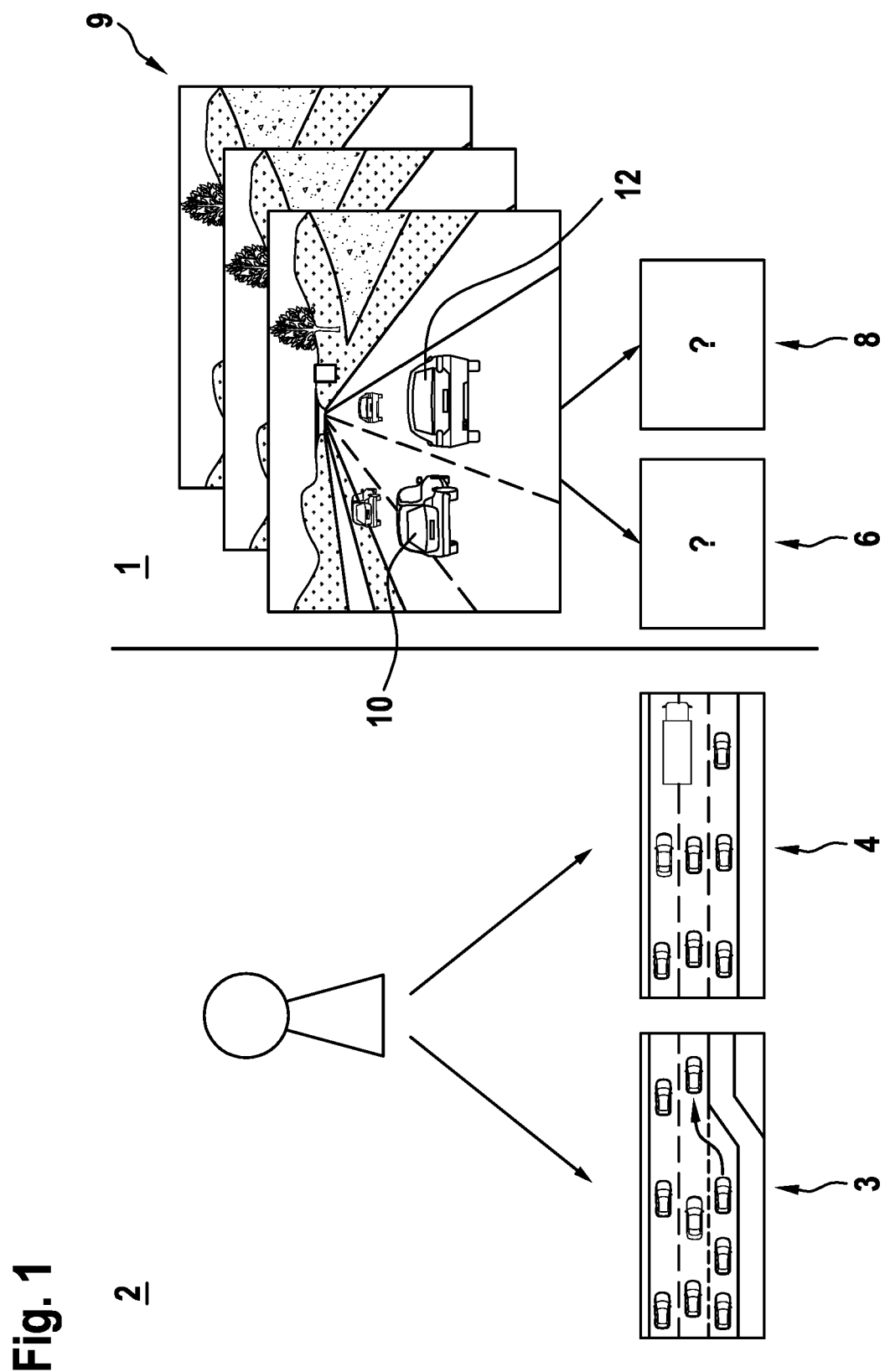

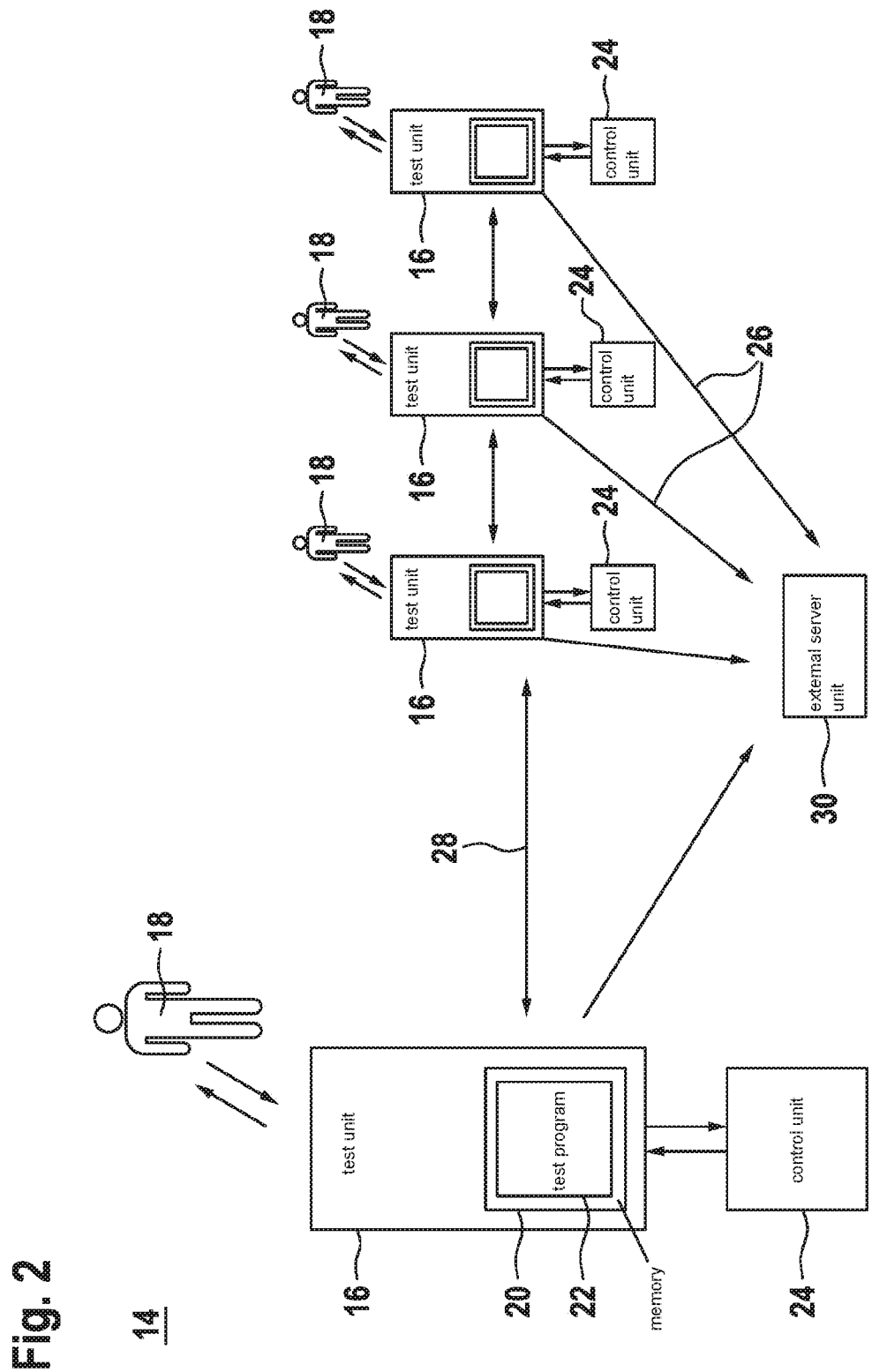

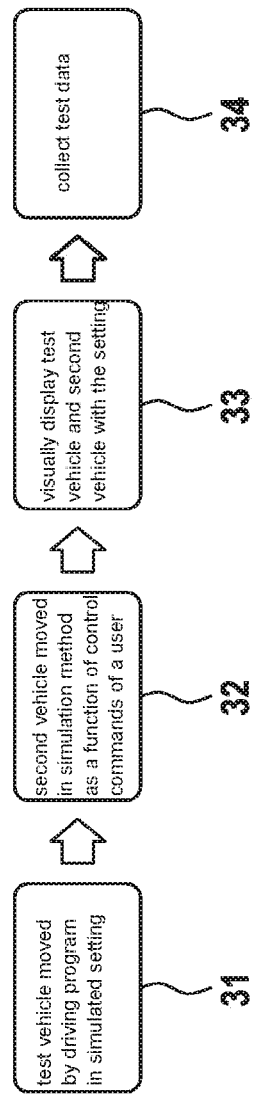

COMPUTER-IMPLEMENTED SIMULATION METHOD AND SYSTEM FOR TESTING CONTROL UNITS

FIELD

The present invention relates to a computer-implemented simulation method for testing a driving program for the at least partially autonomous guidance of a test vehicle, as well as a system for testing at least one control unit or one driving program of the control unit.

BACKGROUND INFORMATION

To validate automatable vehicle systems, the vehicle systems are intended to cover several millions of kilometers in order to be able to ensure the safety of the vehicle systems as compared to conventional vehicles controlled by drivers.

In practice, at least a portion of the kilometers to be covered may be replaced by the use of simulations. Such simulations should be able to reflect all realistically possible conditions. However, a simulation that covers all realistic conditions or scenarios is difficult to implement, since the simulated scenarios are limited by the experience and the creativity of a defined number of experts and engineers.

A computer device for receiving user inputs, which select at least one test parameter associated with the autonomous operation of a virtual vehicle in a virtual environment, is described in German Patent Application No. DE 10 2016 100 428 A1. In this way, it is possible to simulate a virtual environment that includes the at least one test parameter.

SUMMARY

An object of the present invention is to provide a method and a system, which are able to generate data relating to a driving program in a multitude of driving scenarios.

This object may be achieved with the aid of example embodiments of the present invention. Advantageous embodiments of the present invention are described herein.

According to one aspect of the present invention, a computer-implemented simulation method is provided for testing a driving program for the at least partial autonomous guidance of a test vehicle. In accordance with an example embodiment of the present invention, in the method, the test vehicle is moved by the driving program on a simulated road. A second vehicle is moved in the simulation method as a function of control commands of a user. The test vehicle and the second vehicle are visually displayed to the user including the road. During the simulation method, data relating to the guidance of the test vehicle are collected and stored.

According to one further aspect of the present invention, a system is provided for testing at least one control unit or a driving program of the control unit including at least one test unit and at least one control unit or one driving program of the control unit. The test unit is couplable to the control unit or to the computer program. The system is configured to carry out all steps of the method.

The automatable or autonomous guidance of a vehicle may take place in a partially automated, highly automated, fully automated or driverless manner in accordance with the SAE J3016 Standard.

The simulation method and/or the system may provide one possibility, which is usable for generating different driving scenarios for the purpose of checking functions of control units or their driving programs. These functions or control units may be configured to carry out automatable driving functions in vehicles. The visual display for the at least one user may be implemented by a game-like simulation designed as a test program. The users in this case may create, design and execute different driving scenarios for carrying out tests on control units or the functions.

The functions of the control units may thus be challenged based on the freely creatable scenarios and used via a behavior of the users, as a result of which, for example, errors in the programming of the control units are more quickly identified. The user may manually navigate the driving scenario or virtual environment with a vehicle or with the second vehicle, which may interact with an autonomous test vehicle guided by the control unit in virtual road traffic. In this way, the behavior of the test vehicle initiated by the control unit and the corresponding interaction of the second vehicle with the virtual environment may be monitored and utilized for optimizing the functionality of the control unit. The reaction of autonomous vehicles to manually controlled vehicles, in particular, may be tested and observed by the user. Dangerous driving maneuvers may, in particular, be carried out by the user and critical situations between a manually controlled vehicle and a vehicle controlled by the control unit may be created in order to test the efficiency of automated vehicle systems. The data obtained from the interaction may be collected and stored.

In accordance with the present invention, with the method, it is possible to collect large amounts of data from interactions between vehicles controlled by humans and vehicles controlled in an automated manner. In this way, dynamically and combinationally interesting driving scenarios may be taken into account, which may differ, for example, in terms of maneuvers and positions or configurations of the involved parties. The test data collected via the method may, in particular, be classified as so-called "black swans" or rare and extreme events, in which the efficiency of the autonomous control or of the corresponding control unit is particularly challenged. Such test cases are unable to be accounted for by theoretical preliminary considerations, but only by causing and evaluating a multitude of interactions. Such test cases ascertained by the method are, in particular, advantageous for researching so-called functional deficiencies.

The virtual test environment or the driving scenarios may be generated and carried out as part of a test program, which is implementable by the test unit. The test unit may, for example, be a peripheral or a central computer. In the case of a test unit designed as a central computer, different terminal computers may be coupled to the test unit and various driving scenarios may be simultaneously generated and executed. The respective test units or terminal computers may be preferably operated by users, who are able to complete the driving scenarios in a playful manner.

During the execution of the driving scenarios or during the navigation of the virtual environment by users with the second vehicles, test data may be collected, which reflect the behavior of the test vehicle or of the at least one control unit with respect to the respective situations in the driving scenarios. An analysis of the driving scenarios may also be carried out based on the test data.

Based on the simulation method, it is possible to implement a crowd-sourced platform for generating experimental data from the executed driving scenarios. Due to a high potential number of users and the user-defined or arbitrarily creatable driving scenarios, it is possible to take real potential situations into account when carrying out the tests. The probability that all possible situations are taken into account by the driving scenarios may thus increase with the increasing number of different driving scenarios and users. Such a platform has a higher efficiency than the actual driving of several millions of kilometers using vehicles.

Moreover, the acceptance of automated driving systems may be publicly promoted by such an approach, since automated driving systems may be arbitrarily challenged and used by the users. The access to such a platform may, for example, be publicly provided for this purpose. The method implementable by the system may combine the advantages of so-called "big data" and technical knowledge.

In addition, only little is previously known about the generation of new or previously unknown driving scenarios. Typical simulations, in particular, are configured to take into account driving scenarios that have been explicitly programmed and thus are known in advance. This represents a limitation of the possible use conditions. The simulation method according to the present invention does not include such disadvantages.

According to one specific embodiment of the present invention, data relating to the guidance of the second vehicle and/or of the test vehicle are collected and stored by the driving program during the simulation method. A multitude of use cases may be carried out based on the arbitrarily adjustable operating conditions and the environment of the respective driving scenario. At least one control unit may, in particular, be tested and challenged by the scenarios in terms of its functionality, safety and error tolerance. In this way, it is possible to generate and store a large amount of data, which are available for a further analysis.

According to one further specific embodiment of the present invention, driving scenarios are stored, driving scenarios occurring during the simulation being compared with stored driving scenarios. If predefined similarity or identity of a stored driving scenario with a driving scenario occurring in the simulation exists, at least a portion of the control commands of the driving program for the test vehicle and/or at least a portion of the control commands for the second vehicle is/are detected and stored. With such a comparison of the previously stored driving scenarios with present or instantaneously carried out driving scenarios, it is possible to avoid repetitions in the stored test data and to reduce the memory requirements. The evaluation of the data, in particular, may be simplified as a result, since driving scenarios that are similar or stored multiple times in a memory need not be filtered.

According to one further specific embodiment of the present invention, at least a portion of the control commands of the driving program for the test vehicle are detected and stored during a predefined period of time. To further reduce stored data, it is possible to store only the test data that are relevant within a driving scenario. These may be, in particular, test data within a time interval before or after an accident or after an error in the driving program has occurred. In addition, non-compliance with traffic regulations and the resulting reaction of the test vehicle may be classified as relevant and stored.

According to one further specific embodiment of the present invention, at least a portion of the control commands for the second vehicle are detected and stored during a predefined period of time. Alternatively or in addition to the analysis of the test data of the test vehicle, a connection to a behavior or to a reaction of the test vehicle may be established by analyzing the control commands and the behavior of the user. The evaluation of the driving scenarios may thus be more precisely carried out.

According to one further specific embodiment of the present invention, a stored driving scenario includes a departure from the road by the test vehicle or a departure from the road by the second vehicle or a collision of the vehicle with the test vehicle or a triggered error mode of the driving program. It is possible as a result to use the driving scenario, in which an error, an accident or the like has occurred for carrying out an analysis. The amount of data may be reduced as a result, since only safety-relevant test data are recorded and stored. The stored test data may be used for a further development or trouble-shooting of the control unit software or of the driving program.

According to one further specific embodiment of the present invention, the stored data of the test vehicle are used in order to change at least a portion of the control commands of the driving program, the changed driving program, in particular, being used by a control unit in order to control a real vehicle. The driving program may, in particular, be a software of a control unit, which is responsible for the implementation of an automated driving function in a real vehicle. The data and measured values ascertained by the simulation method may be utilized for trouble-shooting and for optimizing the driving program, so that control units may be virtually improved and prepared for road traffic. The driving program may establish, in particular, the connection between sensor measured data of the vehicle and the generation of control commands and, thus, the vehicle may be controlled in an automated manner as a function of the situation. For this purpose, the driving program may be stored in a memory of the control unit and designed to be executable by the control unit.

According to one further specific embodiment of the present invention, a functionality of the second vehicle is improved if a new driving scenario for the test vehicle has occurred during the simulation. A new driving scenario is present if a corresponding driving situation has not been previously stored in the memory. A new driving scenario may also be present if a previously unknown accident or an unknown error occurs. In such a case, the user may be rewarded for testing the control unit by executing the driving scenario and/or for detecting at least one error during the execution of the driving scenario. Users may thus be motivated to develop unknown driving scenarios and to challenge the automatable driving functions. A user may, for example, be compensated more for causing or generating a previously unknown error. So-called tokens may be used as compensation, for example. In addition, the second vehicle may be improved or modified as a possible reward.

According to one further specific embodiment of the present invention, a real-time simulation of a program of a control unit may be used for the at least semi-automated guidance of a real vehicle. In this way, the reaction of the control unit to different situations may be checked and evaluated. The control unit may be cost-efficiently optimized for the road traffic due to the virtual analysis carried out in advance via the different driving scenarios.

According to one further specific embodiment of the present invention, instructions are output for the user in order to carry out a predefined driving situation in conjunction with the test vehicle. The at least one user may, in particular, be prompted by the test unit to interact within the driving scenario. Alternatively or in addition, the user is provided pieces of information relating to the automatable driving functions. The prompting to interact may take place via instructions that are displayed to the user. In this way, the user is able to become familiar with the autonomously operable vehicle and, for example, to interact with the vehicle according to the instruction. Thus, information about autonomous vehicles may be provided and a safe interaction may be trained. The acceptance of road users with respect to vehicles operable in an automated manner, in particular, may be increased as a result.

According to one further specific embodiment of the present invention, hazard metrics are calculated. This may be carried out by a user during an execution of driving scenarios. A hazard metric represents, for example, a hazard classification for ascertaining a personal negligence of the user by the test unit.

In this way, it may be checked whether an error or a critical situation produced by the vehicle operated in an automated manner has been caused by an error of the control unit or by a user. A critical situation may, for example, be an accident or an unintentional departure from a lane or a roadway. In addition, an initiation of an emergency braking may also be classified as critical.

To carry out the hazard classification, the test unit may ascertain in the background a hazard metric, which includes, for example, a time up to a collision, a risk potential of a braking maneuver, and the like. In addition, it may be checked by the test unit to what extent the vehicle operated in an automated manner in the virtual environment or test vehicle or a user-controlled vehicle adheres to applicable regulations and laws. In this case, it is possible to ascertain, in particular, a personal negligence or a third-party negligence. A maneuver marginal observation may also be implemented as part of the analysis of the behavior of the vehicles involved in the virtual environment of the respective driving scenario.

The hazard metric ascertained based on the legality of a behavior or driving scenarios identified by an error may be stored, in particular, for so-called "replay" simulations. Based on the stored data, the previously identified driving scenario may be virtually executed again using an updated software of the control unit or updated autonomous vehicle control in order, for example, to rule out a reoccurrence of errors.

According to one further specific embodiment of the present invention, instructions for the user are output, which evaluate an assessment of the control of the second vehicle. The user or the player may be informed upon request how dangerous his/her behavior is classified so that he/she may become creative in the interactions. Critical maneuvers that exhibit a high risk potential or are not rule-compliant, for example, may be taken into account and evaluated or may be conveyed to or stored in a server unit of the test unit for the purpose of evaluation.

In one specific embodiment of the present invention, if a user causes a collision, for example, this is not carried out. Instead, the second vehicle of the user is placed collision-free in a start position. Instructions may be inserted by the test unit and explain to the user that even an autonomous vehicle may cause accidents in dynamically unavoidable situations. Technical communication, clarification and technical acceptance may be promoted as a result.

According to one further specific embodiment of the present invention, at least one driving scenario generated by the test unit is designed as a circular course or as a route section. The setting of the vehicle scenario in this case may include city blocks, traffic lights, infrastructure and the surroundings of streets. The user, together with additional users and automated drivers, may thus drive virtually in a circular course or over a randomly generated section of a roadway. The section may, for example, be an expressway, a country road, a city section, and the like. At least one vehicle is preferably controlled by the control unit within the environment of the driving scenario.

Preferred exemplary embodiments of the present invention are explained in greater detail below based on highly simplified, schematic representations.

BRIEF DESCRIPTION OF THE DRAWINGS

FIG. 1 schematically shows a comparison between a conventional simulation and the method according to an example embodiment of the present invention.

FIG. 2 schematically shows a representation of a system that includes multiple test units in accordance with the present invention.

FIG. 3 schematically shows a flow chart for illustrating a method according to one specific embodiment of the present invention.

DETAILED DESCRIPTION OF EXAMPLE EMBODIMENTS

FIG. 1 schematically illustrates a comparison between a conventional simulation 2 and simulation method 1 according to the present invention. In conventional simulations 2, in particular, established situations or driving scenarios are defined by experts, which are taken into account by the simulation. According to the exemplary embodiment, a drive-up situation 3 and an expressway section 4 are displayed as driving scenarios of conventional simulation 2.

In method 1 according to the present invention, different scenarios 6, 8 may be generated and stored by an arbitrary number of users. For the sake of simplicity, two scenarios 6, 8 are depicted, an arbitrary number of scenarios being represented and executed by the users. At least one driving scenario 9 executed by a user may be at least partially stored and compared with previously stored driving scenarios 6, 8. In this way, it is possible to eliminate similar or identical driving scenarios.

The parameters, traffic situations, environmental conditions, vehicle density and the like may be arbitrarily adjusted. The behavior of at least one second vehicle 12 manually controlled by the user with respect to a vehicle or test vehicle 10 controlled in an automated manner by a control unit 22 may, in particular, be directly influenced.

FIG. 2 schematically shows a representation of a system 14 including multiple test units 16. Test units 16 according to the exemplary embodiment are designed as computers and are controlled by users 18.

Test units 16 include a memory 20, in which a test program 22 is stored. Test units 16, controlled by users 18, are able, in particular, to carry out method 1 by executing test program 22. Executed driving scenarios 6, 8, 9 may be stored on memory 20.

Test units 16 are each coupled to control units 24. Control units 24 in this case may be designed in the form of control software or of the driving program or as hardware-based control units. With control units 24, it is possible to control vehicles 10 operable in an automated manner in the virtual environment. As part of executed scenarios 6, 8, 9, control units 24 may be subjected to different conditions and situations, which are freely determinable by users 18.

Respective test units 16 are connected to each other via communication links 26, 28 and data-transmittingly to an external server unit 30. For this purpose, test units 16 may include communication units, not shown for the sake of clarity, for establishing communication links 26, 28.

FIG. 3 schematically shows a flow chart for illustrating a method 1 according to one specific embodiment of the present invention. Computer-implemented simulation method 1 is used to test a driving program for the at least partially autonomous guidance of test vehicle 10.

In one step, test vehicle 10 is moved 31 by the driving program in a simulated setting.

Second vehicle 12 is moved 32 in simulation method 1 as a function of control commands of a user 18. Additional vehicles controlled by additional users or by the test program may also be positioned in the virtual setting and may interact with test vehicle 10.

Test vehicle 10 and at least second vehicle 12 are visually displayed 33 with the setting to user 18.

Test data for carrying out an evaluation are collected 34 during the execution of driving scenarios 6, 8, 9. The test data may include, for example, trajectories of involved vehicles 10, 12 and the virtual sensor data, which are stored as a function of the simulation time. In addition, the test data may also include the control commands of users 18 and of control unit 24 and possible error messages.

What is claimed is:

1. A computer-implemented simulation method for testing a driving program for at least partially autonomous guidance of a test vehicle, the method comprising the following steps:
   moving the test vehicle by the driving program in a simulated setting;
   moving a second vehicle in the simulation method as a function of control commands of a user;
   visually displaying the test vehicle and the second vehicle to the user, including the setting; and
   collecting and storing data relating to guidance of the test vehicle during the simulation method,
   wherein at least one of:
      instructions for the user are output in order to carry out a predefined driving situation in conjunction with the test vehicle, or
      instructions for the user are output, which evaluate an assessment of control of the second vehicle.

2. The method as recited in claim 1, wherein data relating to guidance of the second vehicle are collected and stored during the simulation method.

3. The method as recited in claim 1, wherein driving scenarios are stored, driving scenarios occurring during the simulation being compared with the stored driving scenarios, at least a portion of control commands of the driving program for the test vehicle and/or at least a portion of control commands for the second vehicle being detected and stored when predefined similarity or identity of a stored vehicle scenario with a driving scenario occurring in the simulation exists.

4. The method as recited in claim 3, wherein at least a portion of the control commands of the driving program for the test vehicle are detected and stored during a predefined time period.

5. The method as recited in claim 4, wherein at least a portion of the control commands for the second vehicle are detected and stored during a predefined time period.

6. The method as recited in claim 3, wherein at least one of the stored driving scenarios includes a departure from a road of the setting by the test vehicle or a departure from the road by the second vehicle or a collision of the second vehicle with the test vehicle or a triggered error mode of the driving program.

7. The method as recited in claim 1, wherein the stored data of the test vehicle are used in order to change at least a portion of control commands of the driving program, the changed driving program being used by a control unit to control a real vehicle.

8. The method as recited in claim 1, wherein a functionality of the second vehicle is improved when a new driving scenario for the test vehicle has occurred during the simulation.

9. The method as recited in claim 1, wherein a real-time simulation of a program of a control unit is used as a driving program for at least semi-automated guidance of a real vehicle.

10. The method as recited in claim 1, wherein instructions for the user are output in order to carry out a predefined driving situation in conjunction with the test vehicle.

11. The method as recited in claim 1, wherein hazard metrics are calculated.

12. The method as recited in claim 1, wherein instructions for the user are output, which evaluate an assessment of control of the second vehicle.

13. A system for testing at least one control unit or one driving program of the control unit, comprising:
   at least one test unit; and
   at least one control unit or one driving program of the control unit, the test unit being couplable to the control unit or to the driving program;
   wherein system is configured to:
      move a test vehicle using the driving program in a simulated setting;
      moving a second vehicle in a simulation as a function of control commands of a user;
      visually display the test vehicle and the second vehicle to the user, including the setting; and
      collect and store data relating to guidance of the test vehicle during the simulation,
   wherein at least one of:
      instructions for the user are output in order to carry out a predefined driving situation in conjunction with the test vehicle, or
      instructions for the user are output, which evaluate an assessment of control of the second vehicle.

* * * * *